(12) United States Patent
Trudel et al.

(10) Patent No.: US 11,437,819 B2
(45) Date of Patent: Sep. 6, 2022

(54) DEMAND RESPONSE IMPLEMENTED IN AN INFRASTRUCTURE HAVING A DC LINK

(71) Applicant: BIPCO-SOFT R3 INC., Saint Michael (BB)

(72) Inventors: Gilles Trudel, Anjou (CA); Simon Jasmin, Montreal (CA); Irenee Normandin, Sherbrooke (CA)

(73) Assignee: BIPCO-SOFT R3 INC., St. Michael (BB)

( * ) Notice: Subject to any disclaimer, the term of this patent is extended or adjusted under 35 U.S.C. 154(b) by 0 days.

(21) Appl. No.: 17/188,576

(22) Filed: Mar. 1, 2021

(65) Prior Publication Data

US 2022/0021212 A1    Jan. 20, 2022

Related U.S. Application Data

(63) Continuation of application No. 15/548,803, filed as application No. PCT/IB2016/050591 on Feb. 4, 2016, now abandoned.

(60) Provisional application No. 62/111,807, filed on Feb. 4, 2015.

(51) Int. Cl.
*H02J 3/36* (2006.01)
*H02J 7/00* (2006.01)
*B60L 53/63* (2019.01)

(52) U.S. Cl.
CPC ............... *H02J 3/36* (2013.01); *B60L 53/63* (2019.02); *H02J 7/0027* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y04S 10/126* (2013.01)

(58) Field of Classification Search
CPC .......... B60L 53/63; H02J 3/36; Y02T 90/163; Y02T 90/167; H02H 7/261; H02H 7/268; H02M 5/458; H02M 7/7575
See application file for complete search history.

(56) References Cited

U.S. PATENT DOCUMENTS

| | | | | |
|---|---|---|---|---|
| 3,906,335 A | * | 9/1975 | Watanabe | H02J 3/36 363/79 |
| 4,517,634 A | * | 5/1985 | Sakai | H02J 3/36 363/51 |
| 2011/0204881 A1 | * | 8/2011 | Spratte | F16C 41/00 324/207.13 |

(Continued)

*Primary Examiner* — Kyle J Moody
*Assistant Examiner* — Lakaisha Jackson

(57) ABSTRACT

A system for regulating electrical energy transfer over a pathway including a DC link (16, 18, 20) is provided. The system is configured for computing a rate of electrical energy flow through the DC link at least in part on a basis of a state of balance between power generation and a load determined from frequency measurement (32, 34) and for adjusting the rate of electrical energy flow through the DC link. An electrical vehicle charger is provided that includes a power input for connection to an AC power distribution network and a power output for connection to an electric vehicle, and is configured for determining a rate of electrical energy flow through the power output by using as a factor a state of balance between power generation and load in an AC power distribution network to which the power input connects. A method for regulating electrical energy transfer over a pathway including a DC link is also provided.

7 Claims, 5 Drawing Sheets

(56) References Cited

U.S. PATENT DOCUMENTS

2015/0015213 A1* 1/2015 Brooks .................... H02J 3/24
320/137

\* cited by examiner

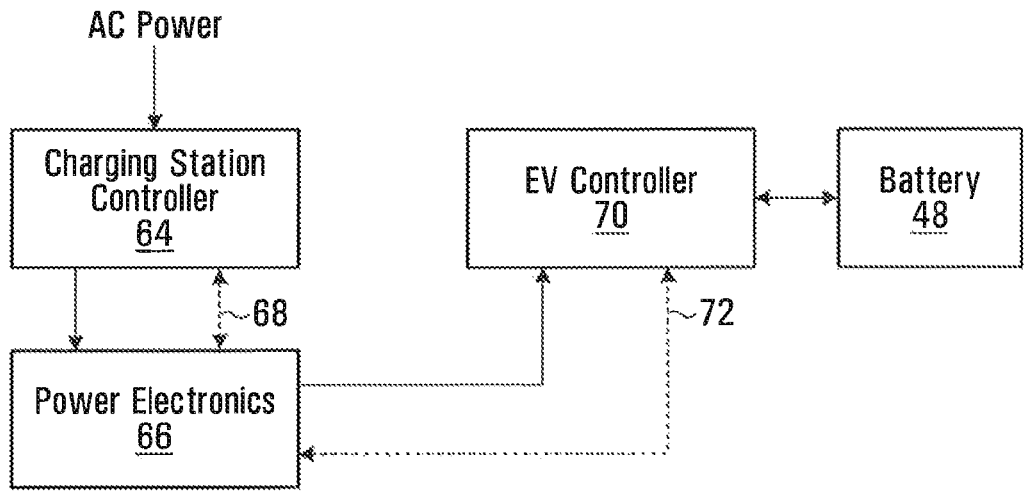
FIG. 5
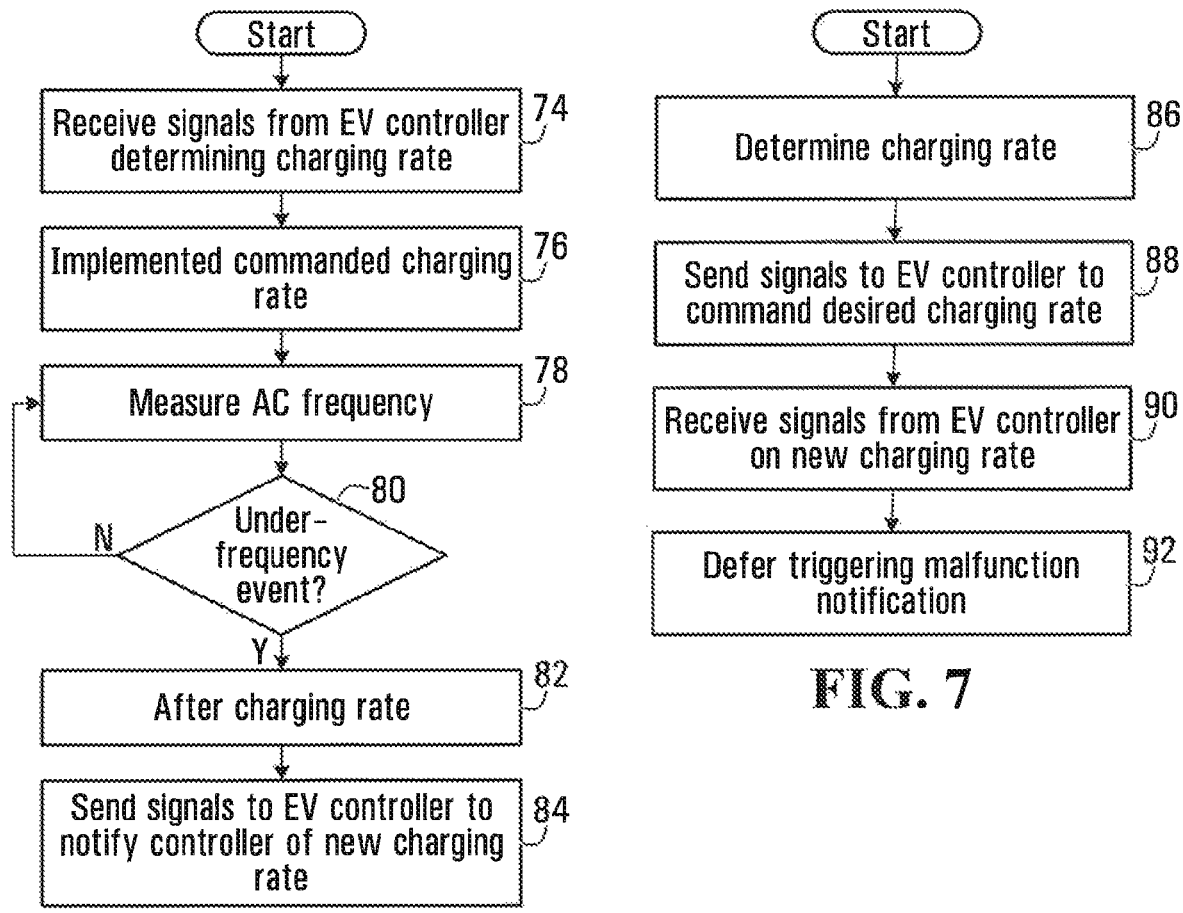
FIG. 6
FIG. 7

DEMAND RESPONSE IMPLEMENTED IN AN INFRASTRUCTURE HAVING A DC LINK

CROSS REFERENCE TO RELATED APPLICATIONS

This application claims priority from U.S. Provisional Patent Application No. 62/111,807 filed on Feb. 4, 2015, the contents of which is hereby incorporated by reference herein.

FIELD OF THE INVENTION

The invention relates to systems, devices and methods for performing demand response in an electric power delivery infrastructure having a DC link.

BACKGROUND

Electric power delivery infrastructures exist that are inherently AC based but involve some sort of DC link. An example is the DC interconnect between two AC power distribution networks. The DC link allows a power transfer between the two AC power distribution networks while allowing each AC power distribution network to maintain its own phase and frequency characteristics.

The DC link has a rectifier stage to convert the incoming AC electrical energy in DC electrical energy and an inverter stage that converts the DC electrical energy back into AC electrical energy. The conversion of AC to DC is independent of the phase and the frequency in either AC power distribution network at any given moment. However, the conversion DC to AC needs to take into account the phase and frequency of the AC power distribution network that receives the electrical energy such that the energy injection is properly synchronized. The synchronization is performed by a controller that samples the phase and frequency of the receiving AC power distribution network and operates the inverter stage to generate an AC waveform that has the same frequency and phase as the receiving power distribution network.

The DC link can be bi-directional allowing the electrical energy transfer to be reversed. In this instance, each stage of the DC link can selectively operate as a rectifier stage and as an inverter stage. The controller is configured to sample the phase and frequency in both networks and uses the relevant phase/frequency information depending on the direction of the electrical energy transfer.

Another example of a power delivery infrastructure using a DC link is an electric vehicle charging station. The charging station receives AC electrical energy that is converted to DC and supplied in DC form to charge the battery of the vehicle. The rate at which the electrical energy is delivered to the electric vehicle is controlled to suit the needs of the charging process. A control module on the vehicle determines the rate at which the electrical energy needs to be delivered to the battery and communicates with the charging station that regulates it accordingly. The regulation is performed by changing the DC voltage; the lower the DC voltage supplied, the lower the rate at which the electrical energy is supplied. Conversely, the higher the DC voltage, the higher the rate of energy delivery.

Demand response refers to a dynamic response that the demand, i.e, the entity that receives the electrical energy manifests, based on certain conditions in the AC power distribution network that supplies the electrical energy. One example of response is to reduce the consumption of electrical energy when the AC power distribution network experiences a power generation deficit. Another example is to increase the consumption of electrical energy when the AC power distribution network experiences a power generation excess. Examples of demand response strategies are described in PCT International Publication No. WO 2013/177689 A1 the contents of which is hereby incorporated by reference herein.

SUMMARY

In accordance with a broad aspect, a system for regulating electrical energy transfer over a pathway including a DC link is provided. The system includes a data processing device, which includes a machine readable storage encoded with non-transitory software for execution by a CPU, the software being configured for computing a rate of electrical energy flow through the DC link at least in part on a basis of a state of balance between power generation and load in an AC power distribution network to which the pathway connects and an output for generating a control signal for adjusting the rate of electrical energy flow through the DC link according to the computed rate.

In accordance with another broad aspect, an electrical vehicle charger is provided. The electrical vehicle charger includes a power input for connection to an AC power distribution network, a power output for connection to an electric vehicle to supply electrical energy for charging a battery of the electric vehicle and a data processing device. The data processing device includes a machine readable storage encoded with non-transitory software for execution by a CPU, the software being configured for determining a rate of electrical energy flow through the power output by using as a factor a state of balance between power generation and load in an AC power distribution network to which the power input connects and an output for generating a message to a controller of the electrical vehicle to notify the controller that the rate of electrical energy flow is being adjusted on the basis of a loss of balance between power generation and load in the AC power distribution network.

In accordance with yet another broad aspect, an electrical vehicle charger is provided. The electrical vehicle charger includes a power input for connection to an AC power distribution network and a power output for connection to an electric vehicle to supply electrical energy for charging a battery of the electric vehicle. The electrical vehicle charger also includes a data processing device, including a machine readable storage encoded with non-transitory software for execution by a CPU, the software being configured for determining a rate of electrical energy flow through the power output by using as a factor a state of balance between power generation and load in an AC power distribution network to which the power input connects. The data processing device is configured to negotiate with an electrical controller of the electric vehicle a rate of charge to be supplied to the electrical vehicle when a loss of balance occurs between power generation and load in the AC power distribution network.

In accordance with a further broad aspect, a method for regulating electrical energy transfer over a pathway including a DC link is provided. The method includes computing a rate of electrical energy flow through the DC link at least in part on a basis of a state of balance between power generation and load in an AC power distribution network to which the pathway connects and adjusting the rate of electrical energy flow through the DC link according to the computed rate.

These and other aspects of the invention will now become apparent to those of ordinary skill in the art upon review of the following description of embodiments of the invention in conjunction with the accompanying drawings.

DESCRIPTION OF THE DRAWINGS

A detailed description of embodiments of the invention is provided below, by way of example only, with reference to the accompanying drawings, in which:

FIG. 5 is a more detailed diagram of the vehicle charging station shown in FIG. 4;

FIG. 6 is a flowchart illustrating the decisional process implemented by the software controlling the operation of the vehicle charging station shown in FIGS. 4 and 5;

FIG. 7 is a flowchart illustrating the decisional process implemented by the software controlling the charging of the electric vehicle.

It is to be expressly understood that the description and drawings are only for the purpose of illustrating certain embodiments of the invention and are an aid for understanding. They are not intended to be a definition of the limits of the invention.

DETAILED EXAMPLE OF IMPLEMENTATION

Figure 1:
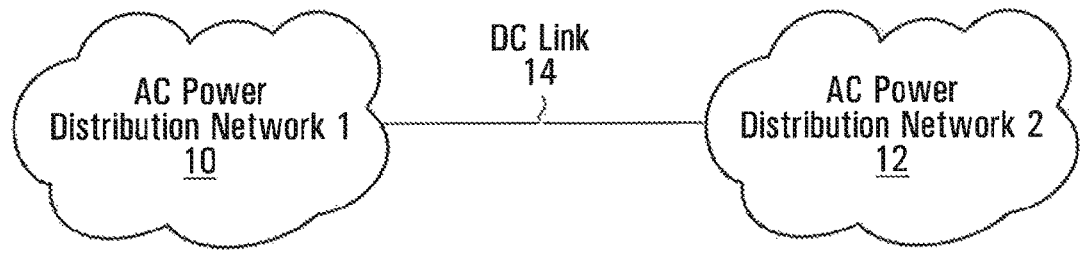
FIG. 1 is a diagram illustrating two AC power distribution networks connected by a DC link.

FIG. 1 illustrates two AC power distribution networks, namely network 1 and network 2 designated by reference numerals 10 and 12, respectively, connected to each other by a DC link 14. The purpose of the DC link 14 is to allow electric energy to be transferred from one network to the other while allowing each network to operate at its own phase and frequency. This way, there is no need to synchronize the networks so they operate at the same phase and frequency. In most instances, the frequency of the electrical energy in both networks will be the same, however the phase will be likely different.

Figure 2:
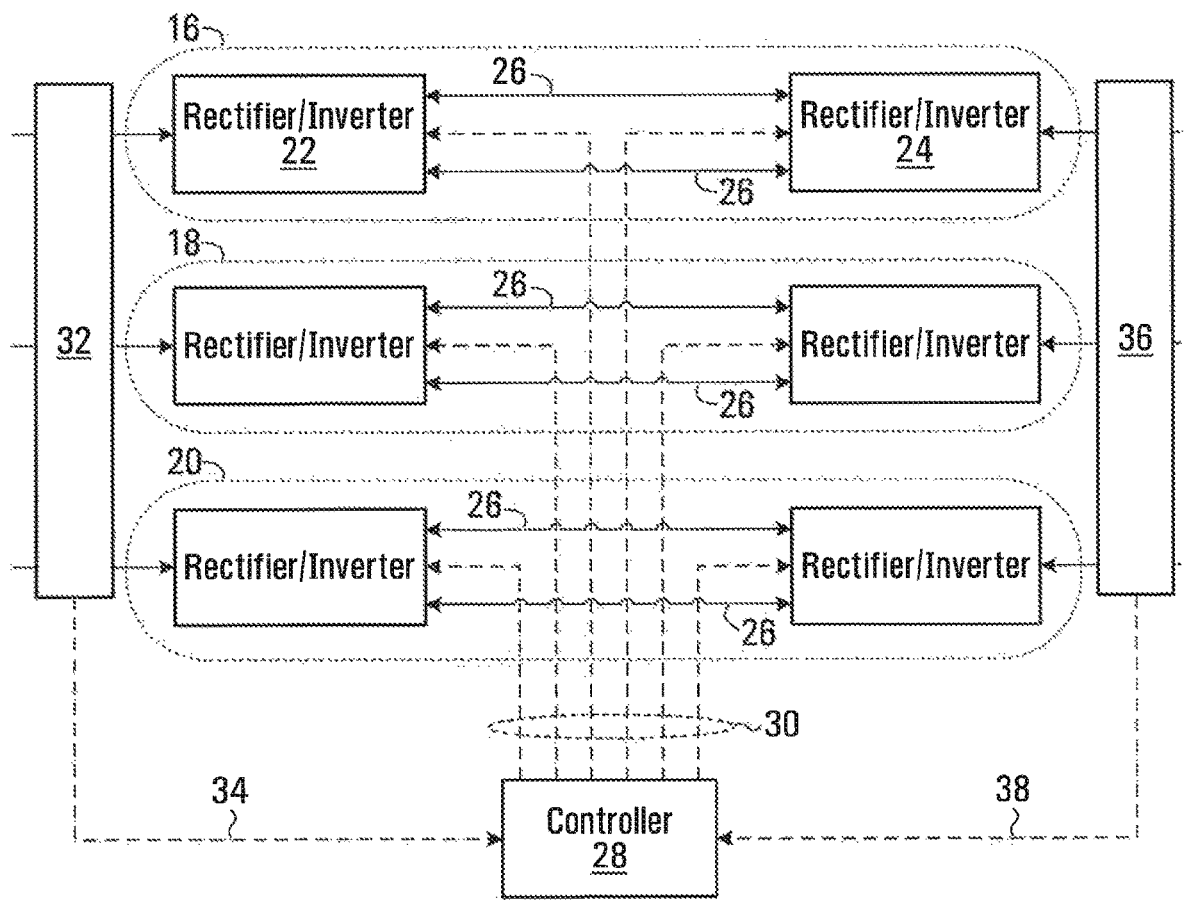
FIG. 2 is a more detailed diagram of the DC link shown in FIG. 1.

A more detailed block diagram of the DC link is shown in FIG. 2. The DC link has three identical DC channels 16, 18 and 20. Each DC channel handles a single electrical energy phase. Since the electrical energy is distributed in each network by a three-phase AC power stream, one DC channel handles each phase separately.

Since the DC channels 16, 18 and 20 are identical in terms of structure and operate in the same manner, only one will be described for simplicity.

The DC channel 16 has a rectifier/inverter stage 22 that is connected to another rectifier/inverter stage 24 via a DC connection 26. The rectifier/inverter stages 22, 24 operate as rectifier or inverter depending on the direction of power flow. For example, if network 10 is sending electrical energy to network 12, the rectifier/inverter stage 22 operates as a rectifier while the rectifier/inverter stage 24 operates as an inverter. If the power flow direction was to be reversed, the rectifier/inverter stages 22, 24 would operate in the reverse configuration.

Note that, for an electrical energy flow that is set once and will not change, a simpler DC channel structure can be used that has a dedicated rectifier stage connected to the source network and a dedicated inverter stage connected to the receiving network.

The rectifier stage 22 operates by converting the incoming electrical energy on a given phase from AC to DC. For example, the rectifier stage 22 may use a solid state rectifier bridge that provides full-wave rectification. The output of the rectifier stage 22 is a rectified electrical energy flow, which for convenience is referred to in this specification as DC, although in some cases the flow will not necessarily be a pure DC one as some ripples are likely to be present.

The inverter stage 24 receives the DC power flow generated by the rectifier stage 22 and converts it back into AC form. It is beyond the scope of this specification to provide details on how the DC to AC conversion is being performed. This is something known in the art and the reader is invited to refer to the relevant literature for more information. Generally, the DC to AC conversion is more complicated than the AC to DC one, because in the former case the AC wave needs to be output with a frequency and phase matching those in the receiving network.

A controller 28 manages the operation of the rectifier/inverter stages 22, 24. The controller 28 is computer based, including a machine readable storage encoded with software for execution by one or more CPUs. The software defines logic, which determines how the rectifier/inverter stages 22, 24 operate. The controller 28 outputs control signals 30, directed to the respective rectifier/inverter stages 22, 24. The control signals, which can be conveyed wirelessly or over physical signal pathways, convey commands that control the operation of components of the rectifier/inverter stages 22, 24.

The controller 28 also receives as input information on the frequency of the AC electrical energy in the networks 10 and 12. In particular, a frequency measurement unit 32 supplies frequency information to the controller 28 over input signal path 34, which can be wireless or wireline, from the network 10. Similarly, frequency measurement unit 36, supplies the controller 28 with information on the frequency of the AC electrical energy in network 12, over input signal path 38, which again can be wireless or wireline.

While FIG. 2 shows the frequency measurement units 32, 34 as being separate from the rectifier/inverter stages 22, 24, note that the frequency measurement units 32, 34 can be physically incorporated in the rectifier/inverter stages 22, 24.

Figure 3:
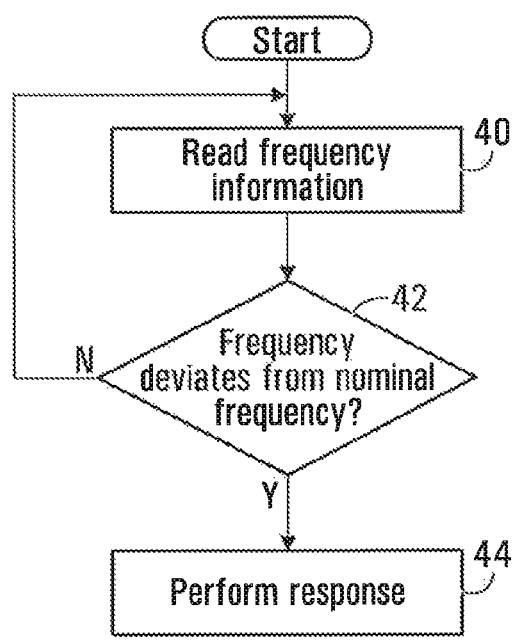
FIG. 3 is a flowchart illustrating the decisional process implemented by the software controlling the operation of the DC link shown in FIGS. 1 and 2.

FIG. 3 is a flowchart, which illustrates the operation of a single DC channel of the DC link 14, it being understood that all the DC channels operate in the same way.

Assume for the purpose of this example that the electrical energy flows from the network 10 to the network 12. This means that the rectifier/inverter stage 22 operates as a rectifier to convert the AC energy in DC form, while the rectifier/inverter stage operates as an inverter to convert the DC electrical energy into AC form and inject it into network 12.

At step 40, the controller 28 gets information on the frequency of the AC energy in the source network 10. At step 42, the controller 28 determines on the basis of the received frequency information if the frequency in the source network 10 deviates from the nominal frequency of the network 10. If a deviation exists, which signals an under frequency event or an over frequency event, the decision step 42 is answered in the affirmative and the process continues at step 44.

For more information on the way a deviation of the frequency from the nominal frequency is detected, reference may be made to PCT International Publication No. WO 2013/177689 A1.

At step 44 the DC Channel 16 provides a response to the frequency deviation. The response will vary depending on a number of factors, such as the degree of deviation and the negativeness or the positiveness of the deviation, among others. Specific examples are provided below.

In a first scenario, the frequency of the AC electrical energy in the network 10 deviates negatively from the nominal frequency, in other words the frequency diminishes. Such deviation is an under frequency event, that may result from a power generation deficit. The network 10 is thus no longer in a state of balance between power generation and load and the response of the DC channel 16 of the DC link 14 is an attempt to lessen the imbalance by reducing the load on the network 10. The load reduction is performed by diminishing the amount of electrical energy transferred to the receiving network 12.

Once the controller 28 has determined that the network 10 experiences a power generation deficit, it computes the response based on a response strategy. The response strategy, which is encoded in the machine readable storage of the controller 28, reduces the electrical energy transfer to the receiving network 12 on the basis of the degree of power generation deficit. More specifically, the larger the frequency deviation, the larger the reduction of the electrical energy transfer will be. For instance, the reduction can be proportional to the deviation of the frequency from the nominal frequency. Alternatively the reduction can be non linear, as discussed again in PCT International Publication No. WO 2013/177689 A1.

In another example of implementation, the controller 28 uses the frequency information to derive a rate of kinetic energy dissipation in network 10. The rate of kinetic energy dissipation is related to the rate of variation of the frequency from the nominal frequency, as discussed in PCT International Publication No. WO 2013/177689 A1. The controller 28 thus reduces the transfer of electrical energy from network 10 to network 12 in relation to the determined rate of kinetic energy dissipation.

In terms of the actual implementation of the response by the rectifier; inverter stages 22, 24, the controller 28 sends out control signals which regulate the operation of the stages in order to obtain the desired electrical energy flow between the two networks. For example, to reduce the flow of electrical energy between the networks 10, 12, the rectifier stage can be operated such as to rectify only a portion of the incoming AC wave and inject over the DC connections a reduced amount of electrical energy. As indicated previously, the rectifier stage is a full-wave rectifier. This means that during normal operation, the whole of the input waveform is converted to a constant polarity, either positive or negative. When it is desired to choke the electrical power flow, something less than the whole waveform is converted into constant polarity. This can be performed by using semiconductor power switches that are commanded to block a portion of the incoming waveform. Since a full cycle of the incoming waveform, including a positive half-cycle and a negative half-cycle spans 360 degrees, the semiconductor power switch can be commanded to block any portion of that 360 degree cycle, thus varying the RMS DC voltage output by the rectifier stage 22. By lowering the RMS DC voltage, the amount of electrical energy transferred to the network 12 is effectively reduced.

Another method that can also be used to choke the electrical energy transfer to the network 12 is at the inverter stage 24. Here, the semiconductor power switches are operated by the controller 28 such as to lower the voltage of the AC output waveform injected in the network 12; the lower the voltage, the lower the electrical energy transfer.

It is also possible for the deviation of the frequency from the nominal frequency to be positive, in other words the frequency increases above the nominal frequency. Such an over frequency event is indicative of a power generation surplus; the power and the load are no longer in a state of dynamic balance, rather more electrical energy is being injected in the network 10 than what is being consumed.

The appropriate response to an over frequency event is to increase the electrical energy transfer to the network 12. That transfer can be performed according to any one of the response strategies discussed earlier, namely linearly varying the electrical energy transfer in relation to the variation of frequency with relation to the nominal frequency, in the over frequency domain. Another possibility is to vary the electrical energy transfer in relation to the kinetic energy buildup in the electric generators, namely to reduce that buildup. As indicated previously, the rate of input or output of kinetic energy in the network is determined on the basis of the rate of frequency variation. The notion of "rate of frequency variation" is discussed in PCT International Publication No. WO 2013/177689 A1.

A possible variant to the process illustrated in FIG. 2 is to vary the transfer of electrical energy through the DC link 14 not only on the basis of the frequency deviation in the source network 10, rather on the basis of the frequency deviation occurring in the destination network 12. In this arrangement, one network assists another when the latter experiences an under frequency event or an over frequency event.

That variant works essentially along the same lines as the earlier example with the exception that the controller 28 takes frequency information from the destination network 12 instead of the source network 10.

To elaborate, if the frequency information from the destination network 12 indicates that a negative deviation exists between the network frequency and the nominal frequency, indicating the existence of a power generation deficit in the destination network 12, the controller 28 operates the rectifier stage 22 and the inverter stage 24 such as to increase the rate of transfer of electrical energy from the source network 10 into the destination network 12. In this fashion, the DC link 14 acts to reduce the imbalance in the destination network 12 by injecting additional electrical energy into it.

In the case of an over frequency event in the destination network 12, the reverse occurs, for instance the controller 28 operates the DC link such as to reduce the rate of electrical energy being injected in the destination network 12, thus lessening the excess generation capacity in the destination network 12.

Figure 8:
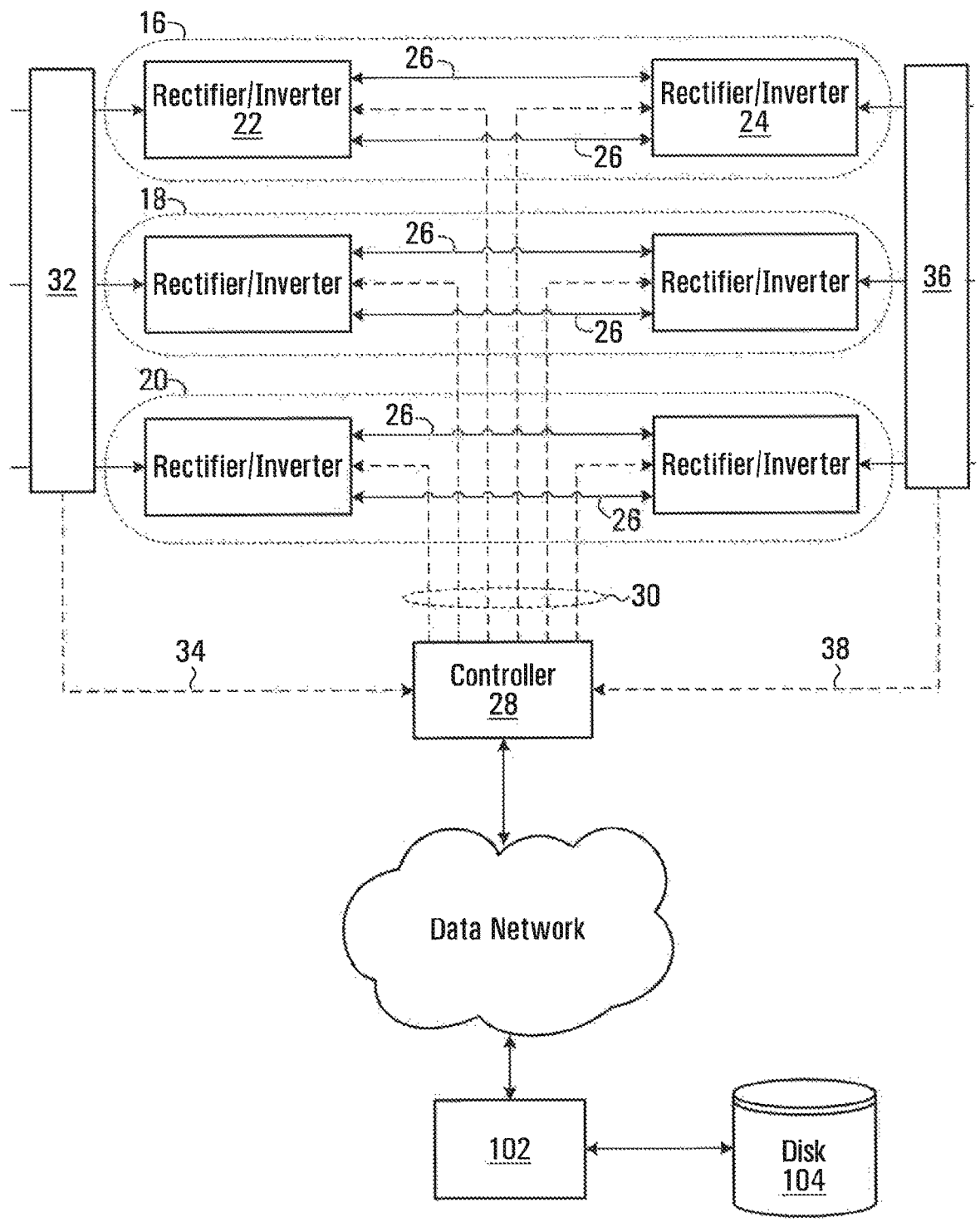
FIG. 8 is a diagram of a DC link according to another embodiment of the invention, providing logging functions to account for electricity transfer between two networks and also recording occurrence of extraneous events such as under frequency conditions in either network.

FIG. 8 illustrates another embodiment of the invention in which the DC link 100 is provided with accounting control functions to account for the electricity that is being sent from one network to the other. The accounting function is such that it takes into consideration the reduction of the electrical energy transfer occurring during an under frequency event. The accounting function also takes into consideration the increase of the electrical energy transfer occurring when the source network supports the destination network that experiences an under frequency condition.

The structure of the DC link is the same as described earlier with the exception of the logging function that describes the various events and conditions that have occurred during the operation of the DC link. During a normal mode of operation, the controller 28 accounts for the amount of electricity that is being transferred from one network to the other, and sends that information over a data link connection to a server 102. Typically, the server 102 resides remotely from the DC link 100. As such, the data link connection is performed through a data network such as the Internet.

The electricity usage data is recorded by the server 102 on a machine-readable storage medium 104. The machine-readable storage medium 104 thus stores a succession of records, each record being associated with electricity usage occurring over a certain time. In addition to specifying the amount of electricity transferred from one network to the other, the record also identifies the direction of the transfer and the circumstances under which the transfer occurred. For example, when the rate of electricity transfer was reduced as a result of an under frequency condition in the source network, the record provides this information since a monetary penalty may then apply to the utility company managing the source network. Similarly, the record would also specify when an increase of electrical energy transfer was required to support the destination network in which an under frequency condition exists. That information can be used later on to compute an excess fee, stacking up on the regular electricity transfer fee, to support the receiving network.

The server 102 runs accounting software that processes the records stored in the machine-readable storage 104. The purpose of the accounting software is to generate debit or credit information as to what the utility companies, that own the source and the destination networks, owe each other for the transfer of electrical power. By logging information on extraneous events occurring during the operation of the DC link 100, such as under frequency events in either network or adjustments to the rate of electrical energy transfer to handle those events, a more accurate debit or credit information can be produced.

Figure 4:
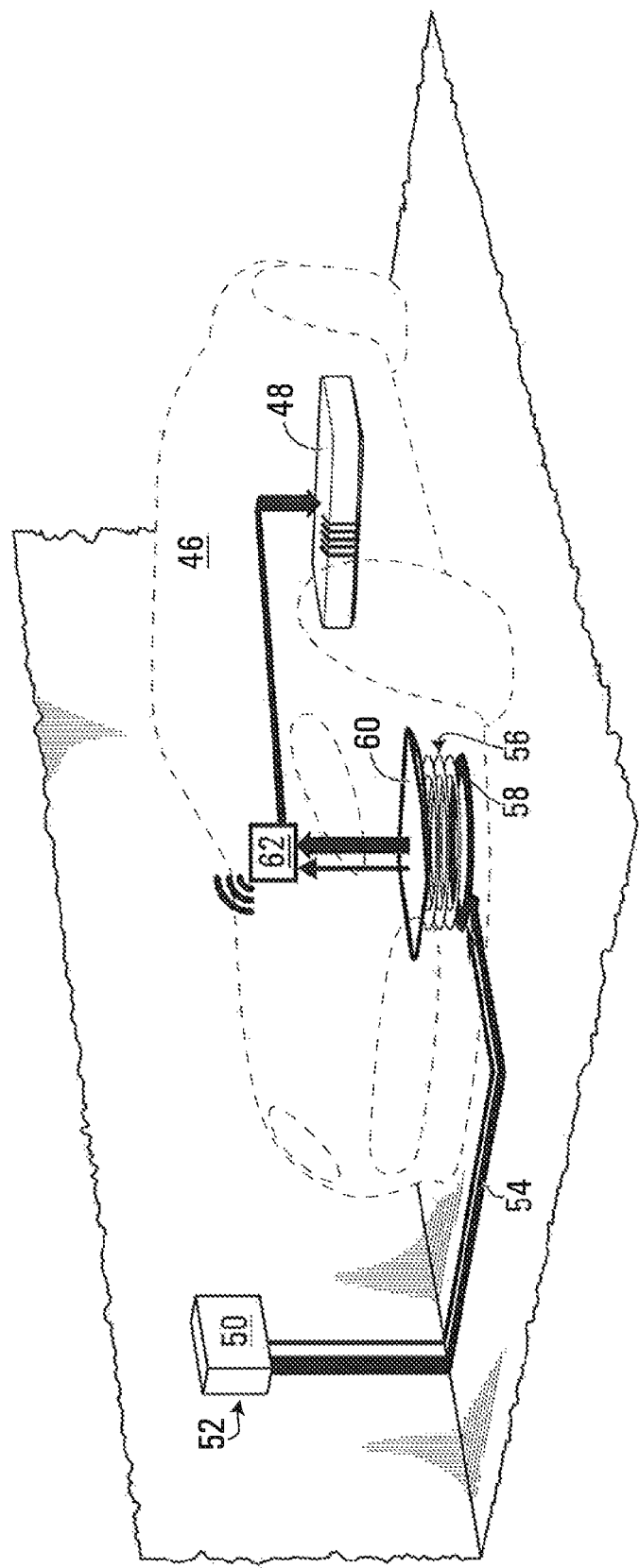
FIG. 4 is a diagram of another example of implementation of the invention, illustrating an electric vehicle charging station to which is connected an electric vehicle and which has a battery that is charged by the charging station.

FIG. 4 illustrates another embodiment of the invention, which relates to a charger for an electric vehicle (EV). The electric vehicle 46 has a battery 48 that is charged by an EV charger 50. The EV charger is supplied with AC power, which is converted in DC form to Charge the battery 48 of the electric vehicle 46.

Different types of power connections with the vehicle 46 are possible. In the specific example shown in FIG. 4, a wireless connection is used which does not require any physical cable to be connected to the vehicle 46 for the battery 48 to be charged. In this example, the EV charger 50 has a wall mounted housing 52 from which extends a cable 54 leading to a wireless transmission unit 56. The wireless transmission unit 56 has two components; a fixed station 58, and a movable station 60, which is mounted to the vehicle 46. When the vehicle 46 is parked, such that the moveable station 60 registers with the fixed station 58, electrical energy is transferred by induction between the stations 58 and 60.

The electrical energy received by the station 60 is conveyed to a controller unit 62 which, in addition to its control functions also converts the AC electrical energy in DC form such that it can be supplied to the battery 48.

In a more traditional form of implementation, not shown in the drawings, the power path to the vehicle 46 includes a physical cable that is plugged in a receptacle on the vehicle's body. To charge the vehicle, the driver needs to plug the cable extending from the wall mounted housing 52 in the receptacle. Once the vehicle 46 is charged, the cable is unplugged. The wall-mounted unit 52 receives electrical energy in AC form and converts it in DC form such that it is supplied in DC form over the cable. Accordingly, there is no need to perform any conversation from AC to DC at the vehicle.

FIG. 5 is a block diagram illustrating in greater detail the structure of the EV charger 50 and also the controller in the vehicle 46 that regulates the battery charging process. FIG. 5 applies mostly to the latter embodiment where a physical power cable is connected to the vehicle 46 for charging it. However, it will be noted that the wireless variant works conceptually in a similar fashion.

The EV charger 50 has a controller 64 and a power electronics stage 66. The controller 64 is a computer-based platform with a machine readable storage encoded with software for execution by one or more CPUs. The structure of the software determines the operation of the controller 64.

The power electronics stage 66 performs rectification of the AC waveform into a DC. As discussed earlier, a full-wave rectifier arrangement can be used for this purpose. The controller 64 sends control signals to the power electronics stage 66 over a signal path 68, which can be wireless or wireline. The signals are used to convey commands to the power electronics stage 66 such as to regulate the flow of electrical energy to the vehicle 46, notably by decreasing it in the event of an wider frequency condition in the network supplying the EV charger 50 with electrical energy.

The vehicle 46 has an EV controller 70, which is connected to the battery 48. The EV controller 70 is also software based and one of its functions is to regulate the charging process of the battery 48. To avoid rapid battery degradation, the battery 48 needs to be charged at a controlled rate rate. If the battery 48 is completely depleted an initial rapid charging rate is possible, however that rate needs to taper off when stage of charge of the battery increases. The EV controller 70 thus senses the stage of charge (SOC) of the battery and determines the charging rate, in other words the rate at which electrical energy can be safely injected in the battery.

The EV controller 70 communicates with the EV charger 50 such as to regulate the rate at which electrical energy is supplied by the EV charger 50. Such communication makes it possible to use the EV charger 50 with different electric vehicles that have different charging requirements. The communication process allows the EV charger 50 to adapt the charging rate to the specific charging requirements of the vehicle.

The communication can be performed over a physical signaling path, such as an electrical connector that is integrated into the charging plug, which connects to the vehicle. The signaling path is shown at 72 in FIG. 5. The integration of the signaling path into the plug makes it possible to close simultaneously both the power connections and the signaling connections once the plug is inserted in the receptacle on the vehicle.

FIG. 5 shows the signaling path transiting through the power electronics stage 66 to arrive at the charging station controller 64. This arrangement is used when the signaling path is integrated into the power cable. Otherwise, the signaling path may bypass the power electronics stage 66.

A possible variant is to use a wireless communication arrangement, where the EV controller 70 communicates with the charging station controller 64 by using any suitable wireless communication protocol, bluetooth and cellular communication protocols are possible examples.

FIG. 6 is a flowchart that illustrates the various steps of the process performed at the EV charger 50 during the charging process.

At step 74, the charging station controller 64 receives signals from the EV controller 70 that convey to the charging station controller 64 charging rate information. It is assumed that the power connection cable including the signaling path is connected to the plug at the vehicle such that all the power connections and the signaling connections are established. In addition to the charging rate information, the EV controller 70 and the charging station controller 64 can exchange other information as well, such as when the charging process is to begin (when delayed charging is desired), identification about the vehicle fir billing/credit purposes, etc.

At step 76, the charging station controller 64 triggers the current flow toward the vehicle at the desired charging rate. The charging rate can be determined on the basis of the intensity of the current or the voltage. The charging station controller 64 thus sends locally control signals to the power electronics stage 66 such that it outputs the desired charging rate. Note that step 74 above is actually a repetitive step in the sense that the EV controller 70 constantly sends to the charging station controller 64 a target charging rate. The target charging rate changes during the charging process and it is based on factors such as the achieved degree of charge of the battery and its temperature, among others. Accordingly, step 76 constantly adjusts the charging rate based on the target charging rate received from the EV controller 70.

At step 78 the charging station controller 64 measures the AC frequency of the AC power supply and at step 80 determines if an under-frequency event occurs. The measurement of the frequency and the assessment of weather an under frequency condition exists in the power distribution network is performed in the same fashion as discussed in connection with the previous example and also as discussed in the PCT International Publication No. WO 2013/177689 A1.

If an under frequency condition exists, the charger 50 responds by reducing the electrical consumption of the charger. This reduction can be made using one of the strategies discussed in connection with the inter-network DC link and also discussed in the PCT International Publication No. WO 2013/177689 A1. The reduction of the electrical consumption is shown at step 82.

In a possible variant, even if an under-frequency condition is noted to exist, a reduction may not be worth making when the demanded rate of charge is low. In such ease, the charger 50 is a minimal load on the network and reducing it further would not yield any substantial benefit in terms of lessening imbalance between power generation and load. Accordingly, it is possible to provide between steps 80 and 82 another conditional step that determines the current rate of charging and compares it to a threshold. If the rate of charging is low and below the threshold, no action is taken. A reduction of the charging rate occurs only if the current charging demand exceeds the threshold.

Assuming a reduction of the charging rate is desirable, the charging station controller 64 proceeds to step 84 at which the charging station controller 64 sends signals to the EV controller to notify the EV controller that the demanded charging rate cannot be met. The purpose of this signal is to avoid the EV controller 70 to trigger a malfunction condition. Since the EV controller 70 is unaware of the reason for the charging rate reduction, it may interpret the reduction as a malfunction of the charger 50 and in order to protect the vehicle it will take a protective action. The protective action may include interrupting the charging process and also logging an error code via the vehicle diagnostic system.

The downside of triggering a protective action is twofold. First, the charging process is aborted, such that when the under frequency condition subsides, the charging does not resume. The vehicle will only be partially charged, which is an inconvenience. Second, an error code will show on the vehicle dash, which is an annoyance since the owner may have to clear that may require a mechanic intervention.

However, if the EV controller 70 is made aware that the reduction in the charging rate is deliberate and temporary, it will not interpret it as a malfunction and will not trigger a protective action.

The way the charger 50 and the EV controller 70 handle the charging rate reduction may vary. One possibility is for the EV controller 70 to continue accepting whatever charging rate the charger 50 can offer. Another option is to temporarily terminate the charging process until the under frequency condition has subsided. In this instance, the charging process resumes at a later time.

Resuming the charging process can be done at a specified time; since under frequency events are usually of short duration, typically less than 30 minutes, the charging station controller 64 and the EV controller 70 may trigger a timer at each end, programmed for a certain time delay, and once the timers expire, they attempt to re-establish the charging process.

Alternatively, the EV controller 70 may be programmed to periodically send a signal to the charging station controller 64 to query the charging station controller 64 if it is ready to resume the charging process. While the under frequency condition is underway the charging station controller 64 denies the requests; only when the under frequency condition has passed it accepts the request and the charging process resumes.

Yet another option is for the charging station controller 64 to initiate the charging process; it sends a signal to the EV controller 70 to notify the EV controller that it is ready to resume the charging process.

FIG. 7 illustrates the steps of the process implemented at the EV controller 70. Some of those steps where described briefly above, however the following description will provide further details.

At step 86, the EV controller 70 determines the charging rate required based on the SOC of the battery and/or other parameters. At step 88, the EV controller 70 sends signals to the charging station controller 64 to notify the charging station controller of the charging requirements. Steps 86 and 88 correspond to a normal state of operation.

Step 90 is performed when an under frequency condition occurs. The EV controller 70 receives the signals from the charging station controller 64 indicating that a temporary discrepancy occurs between the commanded charging rate and the rate being delivered. At step 92, in response to the signals at step 90, the EV controller 70 refrains from triggering a malfunction condition and any associated protective action.

The reduction of the electrical energy consumption response may thus be made when various frequency deviation conditions are recognized in the power distribution network. One of those conditions is a deviation of the frequency from a nominal frequency, where what is being tracked is the difference between the nominal frequency and the instant frequency. Another condition could be the rate of deviation of the frequency, which represents the rate of kinetic energy dissipation in the power distribution network. Also, the frequency deviations could be negative (lowering of the frequency) or positive (over frequency). In an over frequency situation, the reverse response is produced, which is to increase the electrical consumption. In that scenario, the charger 50 notifies the EV controller 70 of the event and of the desire to inject more electrical energy in the battery. If the EV controller accepts the additional energy intake, it sends an acknowledgment signal to the charger 50 that may include also a limit as to how much the electrical energy injection rate can be increased, to avoid damaging the battery of the vehicle.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A system for regulating an electrical energy transfer over a pathway including a DC link established between a first AC power distribution network and a second AC power distribution network, comprising:
   a. a machine-readable storage encoded with a non-transitory software for execution by one or more CPUs, the software being configured to:
      i. receive at an input data related to a characteristic of an electrical energy distributed in the first AC power distribution network and conveying a state of balance in the first AC power distribution network, between power generation and load,
      ii. process the data and in response to detection of a state of imbalance between the power generation and load in the first AC power distribution network, compute a reduced rate of electrical energy flow through the DC link, from the first AC power distribution network to the second AC power distribution network, at least in part on a basis of a magnitude of the state of imbalance between power generation and load in the first AC power distribution network, wherein the state of imbalance is characterized by an under frequency condition in the first AC power distribution network,
   b. an output for generating a control signal for adjusting the rate of electrical energy flow from the first power distribution network to the second power distribution network over the DC link, according to the computed reduced rate.

2. A system as defined in claim 1, wherein the data related to a characteristic of the electrical energy distributed in the first AC power distribution network includes data conveying information about the frequency of the AC power distribution network.

3. A system as defined in claim 2, wherein the software is configured for computing an increased rate of electrical energy flow through the DC link, in response to detection of a state of imbalance between the power generation and load in the first AC power distribution network, characterized by an over-frequency condition in the first AC power distribution network.

4. A system as defined in claim 1, wherein the software is configured to compute the reduced rate according to a linear relationship with the magnitude of the state of imbalance.

5. A system as defined in claim 1, wherein the software is configured to compute the reduced rate according to a non-linear relationship with the magnitude of the state of imbalance.

6. A system as defined in claim 1, wherein the software is configured to log events and conditions occurring during the operation of the DC link.

7. A system as defined in claim 1, wherein the software is configured to generate a message sent to a remote server arrangement over a data network, to account for electricity being transferred from the first AC power distribution network to the second AC power distribution network.

* * * * *